May 19, 1925. 1,538,327
H. K. HITCHCOCK
PROCESS AND APPARATUS FOR FORMING SHEET GLASS
Filed June 17, 1922  4 Sheets-Sheet 1

WITNESSES
INVENTOR
Halbert K. Hitchcock

May 19, 1925.  
H. K. HITCHCOCK  
PROCESS AND APPARATUS FOR FORMING SHEET GLASS  
Filed June 17, 1922  
1,538,327  
4 Sheets-Sheet 4

WITNESSES  
J. Herbert Bradley.

INVENTOR  
Halbert K. Hitchcock  
By Winter & Brown  
His attys.

Patented May 19, 1925.

1,538,327

UNITED STATES PATENT OFFICE.

HALBERT K. HITCHCOCK, OF PITTSBURGH, PENNSYLVANIA, ASSIGNOR OF ONE-HALF TO HITCHCOCK EXPERIMENT COMPANY, A CORPORATION OF NEW JERSEY.

PROCESS AND APPARATUS FOR FORMING SHEET GLASS.

Application filed June 17, 1922. Serial No. 569,000.

*To all whom it may concern:*

Be it known that I, HALBERT K. HITCHCOCK, a citizen of the United States, and a resident of Pittsburgh, in the county of Allegheny and State of Pennsylvania, have invented a new and useful Improvement in Processes and Apparatus for Forming Sheet Glass, of which the following is a specification.

The invention relates to a process and apparatus for forming sheet glass, and particularly for drawing the glass from a refractory member having a preliminary sheet shaping slot which is placed below the surface of a bath of molten glass. It has for its principal object to produce sheet glass of uniform thickness and having fine surfaces, practically and continuously. A further object is to anneal such sheet glass continuously as drawn.

Figure 1:
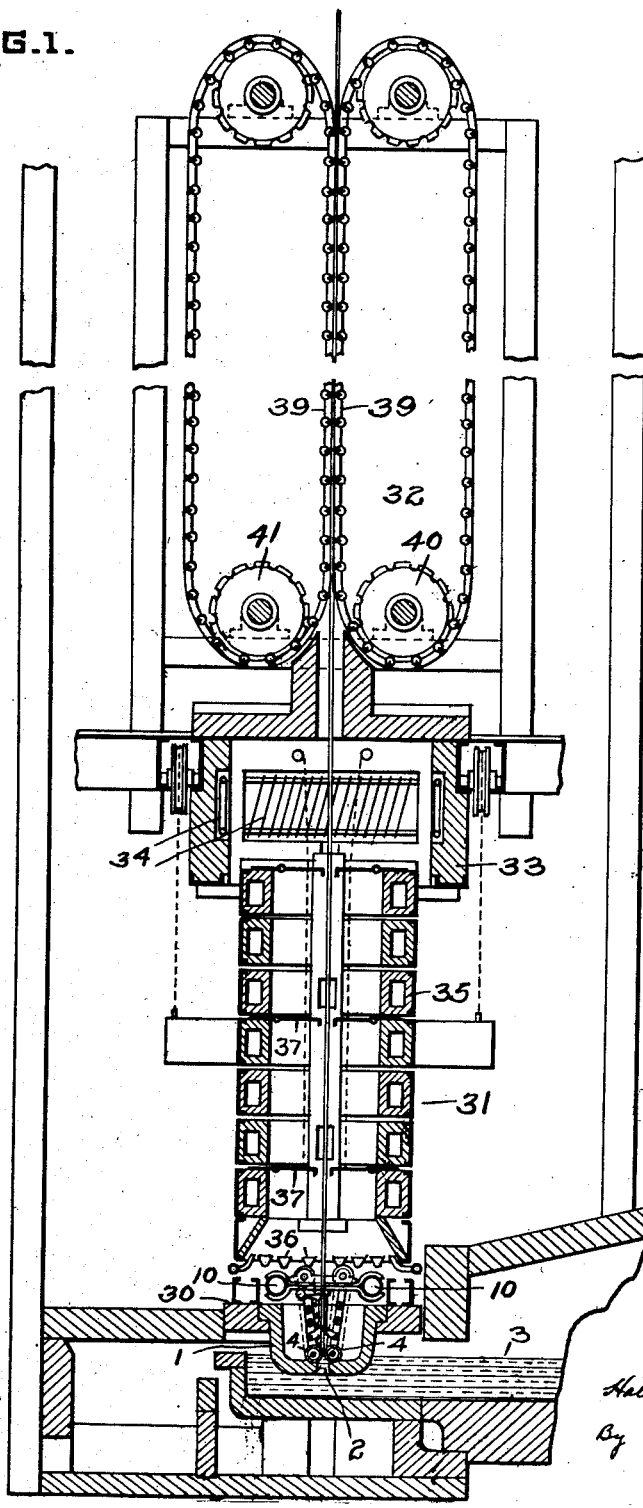
Figure 2:
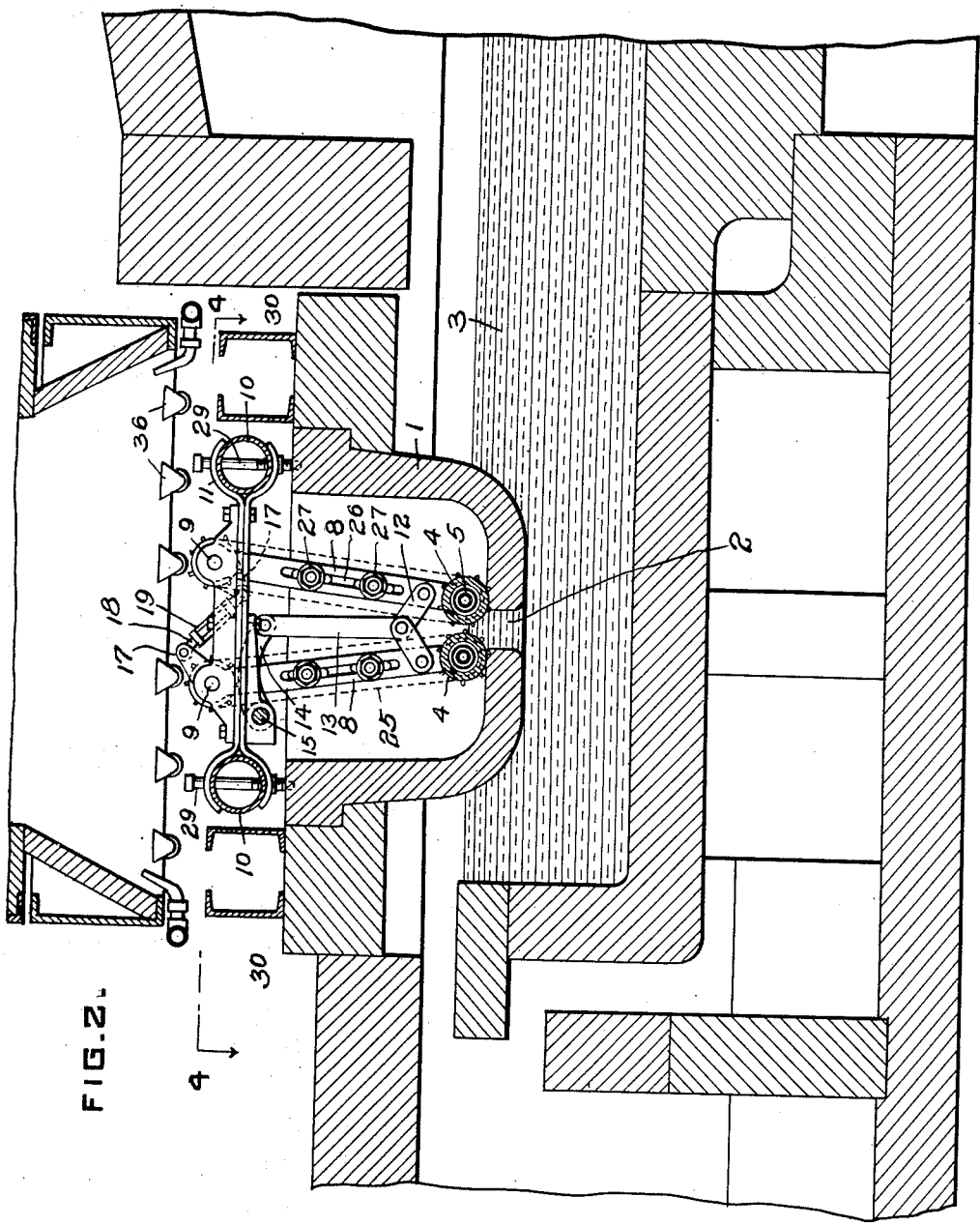
Figure 3:
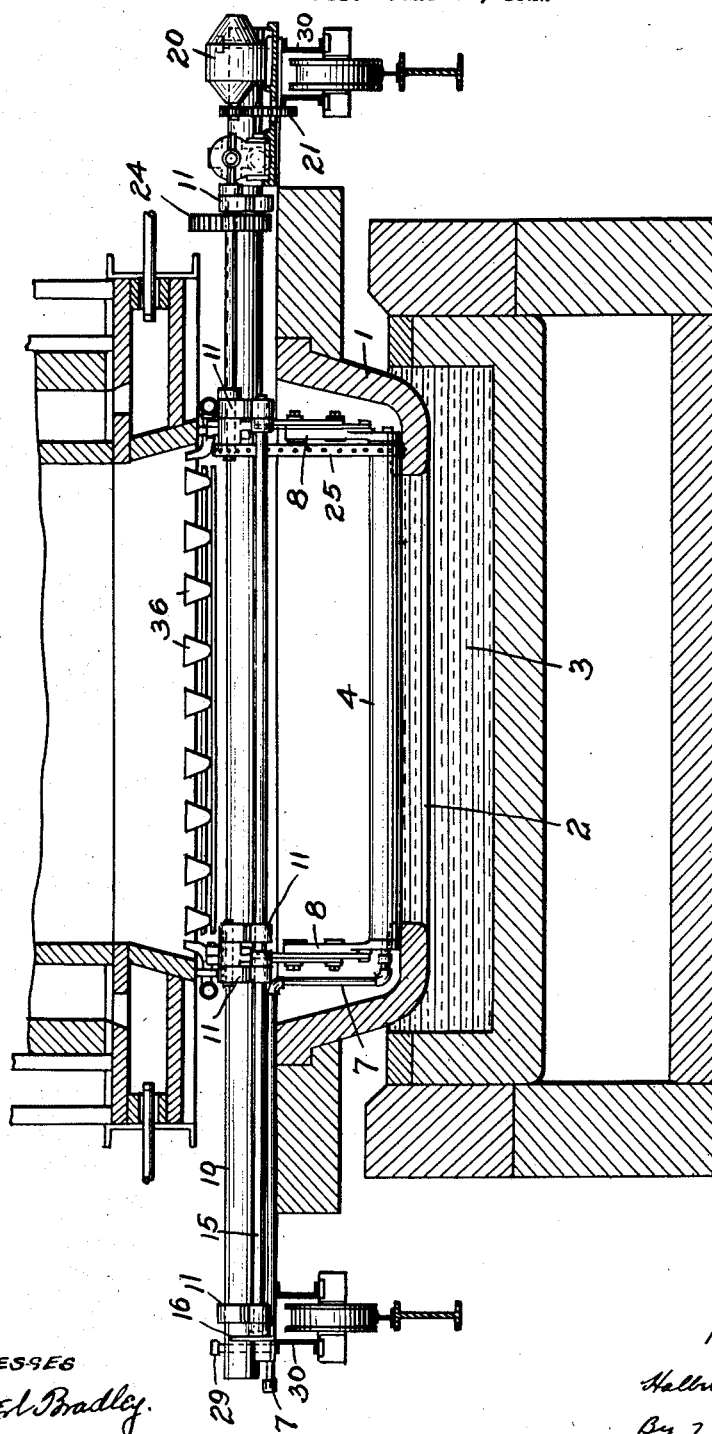
Figure 4:
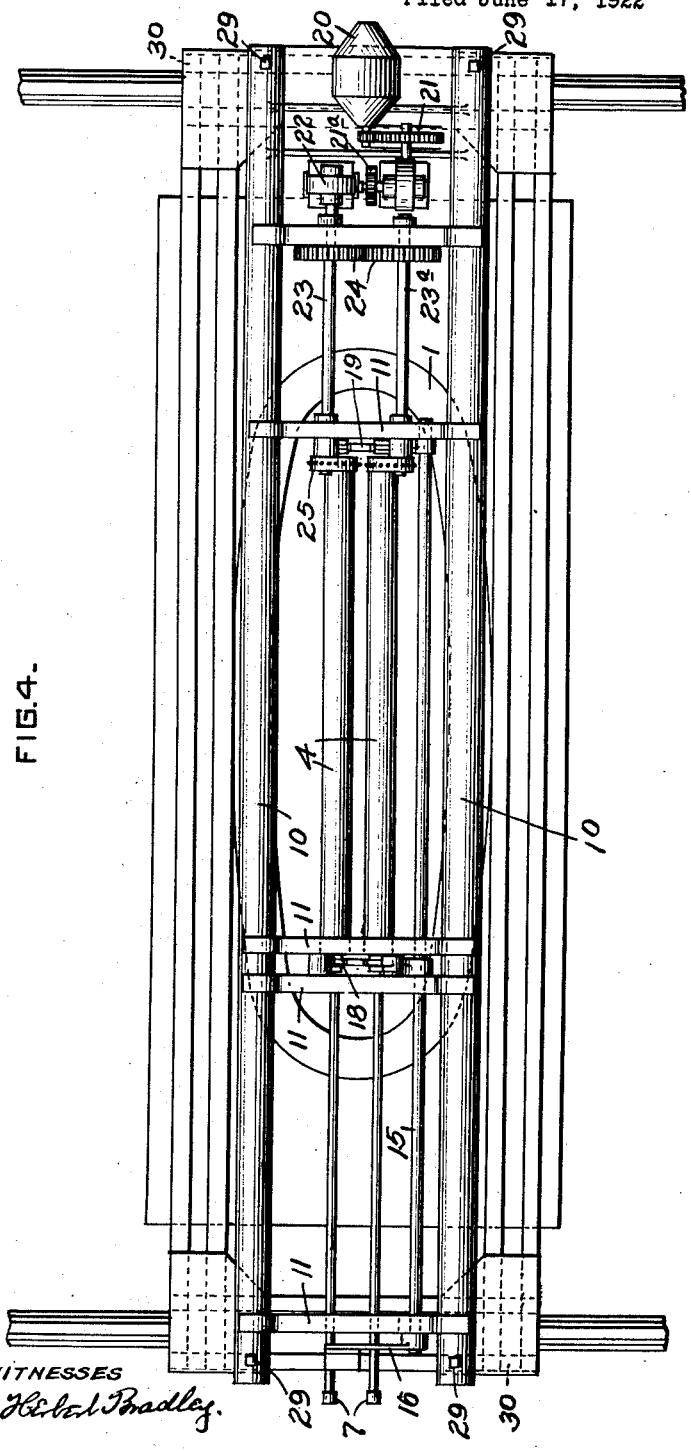
Figure 5:
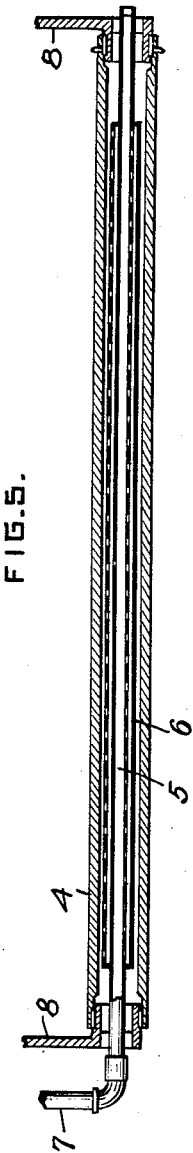

The accompanying drawings illustrate one embodiment of the invention. Fig. 1 is a vertical sectional view of the essential parts of the apparatus, the section being taken transversely of the preliminary forming slot; Fig. 2 illustrates the lower part of the apparatus shown in Fig. 1 on an enlarged scale; Fig. 3 is a vertical sectional view of the lower part of the apparatus taken parallel to and through the forming slot; Fig. 4 is a plan view of that portion of the apparatus below the line 4—4, Fig. 2; and Fig. 5 is a longitudinal section through one of the roller elements.

The essential elements of the apparatus for carrying out the process comprise a refractory member provided with an orifice in the form of a slot which is located below the surface of the bath of molten glass so that the glass will be forced therethrough and thereby giving a preliminary shape similar to that of the finished sheet; a pair of parallel metal rolls located closely adjacent said slot and between which the preliminary sheet while still soft and of substantially uniform temperature throughout, passes and by which it is more accurately dimensioned and reduced to uniform thickness; means to cool said rolls to prevent the glass from adhering thereto; a leer or annealing device through which the glass sheet passes; and mechanism for withdrawing the glass from said slot and carrying the same through said rolls and leer, and also, if desired, stretching the plastic glass sheet to the desired dimension and to impart a brilliant luster to the surfaces thereof.

In carrying out the process the molten glass is forced or extruded through the preliminary shaping slot in the refractory member which will be maintained at a sufficiently high temperature to cause the outside of the sheet to become anchored thereto; the preliminarily shaped sheet thus formed is immediately, and while of substantially uniform temperature throughout and its surfaces still soft, passed between the parallel cooled rolls which serve to give said sheet more accurate dimensions, reduce it to uniform thickness and parallelize its side faces; withdrawing said sheet from the preliminary shaping slot and through the parallel rolls as fast as formed, and, if desired, at such speed as to stretch the still plastic sheet to reduce it to a desired thinner dimension and to remove any surface lines thereon and impart a brilliant luster to the surfaces thereof; and continuously annealing the sheet as formed.

Referring to the drawings, which illustrate one form of my apparatus, 1 is a refractory member provided with a central slot 2. This member is preferably formed of clay as is usual in glass drawing apparatus, but it may be entirely, or at least as to its slot portion, formed of a refractory metal capable of withstanding the temperature and action of the molten glass. The slot portion of said refractory member is normally positioned several inches below the surface of the glass bath 3. This results in the molten glass being forced or extruded through the slot 2 and caused to assume a shape similar to that of the finished sheet. Because said slot portion of the refractory member is immersed in the molten bath, it assumes the temperature of the bath and consequently the glass will adhere thereto and anchor the base of the sheet being formed.

Mounted immediately adjacent to the drawing slot 2, and also partly positioned in the bath of molten glass and therefore serving to act on the preliminarily shaped sheet while it is still plastic and its surfaces still soft, are a pair of parallel rotatable rolls 4 between which the plastic sheet passes. These rolls are preferably made of a metal which will not be affected by the molten glass, such as copper, nichrome, Monel metal, or the like, good results having been secured by the use of nichrome and Monel metal which are very resistant to the heat and to the action of the molten glass.

Means are provided for cooling the rolls 4 in order to prevent them from heating to such degree that the glass will adhere thereto and also to speed the cooling of the glass sheet being formed so that it can be formed at a high rate of speed. This cooling can be effected in various ways. As shown, the rolls 4 are hollow and extending into the same are perforated pipes by means of which a cooling medium, such as compressed air, is caused to impinge against the inner surfaces of said hollow rolls. To insure a proper distribution of the cooling medium, the perforated pipes are preferably formed double, that is, comprise an inner pipe 5 with perforations along one side, and an outer pipe 6 with perforations along its opposite side. Preferably the perforations will vary in size lengthwise of both pipes in order to insure uniform cooling effects for the entire lengths of the rolls. The perforated inner pipe 5 of each roll is connected to a suitable air supply line 7, each supply line being provided with its own control valve, whereby the amount of cooling medium supplied to the interior of the two rolls can be varied as necessary in order to secure uniform or the desired cooling effect on the opposite faces of the glass sheet. The application of the cooling medium also facilitates the chilling of the body of glass adjacent to the refractory member 1 to render it more viscous and thus increase its strength so that it will maintain its form after passing the forming rolls and also cause the anchorage of the base of the sheet to said refractory member which permits the stretching of the glass sheet heretofore referred to and which is desirable for certain glass because of the improved surface imparted to the sheet due to such stretching.

The rolls 4 are of a length at least equal to the full width of the sheet being formed and are preferably exactly parallel, at least for substantially the full width of the sheet. Consequently the plastic sheet passed between them is reduced to uniform thickness from substantially edge to edge. In order to vary the thickness of the plastic sheet provision is made for varying the distance between the rolls. As shown the rolls are rotatably mounted in the lower ends of arms 8 which are pivotally mounted at their upper ends at 9 to a frame comprising parallel tubular side members 10 and cross members 11. Said arms 8 near their lower ends are connected by toggle links 12, from the knuckles or joints of which connecting rods 13 extend to arms 14 secured to a longitudinal shaft 15 rotatably mounted in the frame cross members 11 and extending out to one end of said frame and there provided with an arm or lever 16 by means of which said shaft 15 can be rocked to thereby either flex or straighten the toggle links 12 and thus cause the rolls 4 to be brought either closer together or farther apart. Any suitable means, such as a clamp, may be provided for holding the lever 16 in any position to which it is moved, in order to preserve the spacing of the rollers 4 in the adjusted position.

In order to insure the depending arms of both rolls and at both ends of the rolls moving in unison, the upper ends of said arms have secured thereto crank arms 17, extending in opposite directions, and connected by a connecting rod 18. Consequently the two rolls move in unison toward and from each other, and since there is a cross connection at both ends of the rolls, said rolls will always be in parallelism.

In order to adjust the rolls 4 so that the space therebetween will be central with the forming slot 2, the cross connecting rods 18 are adjustable in length, such as providing them with the turn buckles 19, as shown. Since the crank arms 17 extend in opposite directions, as shown, the lengthening of the connecting rods 18 causes the lower ends of all the arms 8 to move in one direction, and the shortening of said connecting rods causes the lower ends of said arms to move in the opposite direction. In this way the space between the rolls 4 can be brought exactly central with the slot 2.

The rolls 4 are preferably positively rotated, in order to continuously bring a fresh or cool surface into contact with the plastic glass sheet. The rotating means illustrated comprise a small electric motor 20 mounted on one end of the frame and connected through a train of reducing gearing 21, 22 to a longitudinal shaft 23, and which longitudinal shaft 23 is connected by spur gears 24 to a parallel shaft 23$^a$. The shafts 23 and 23$^a$ are mounted in the cross members 11 of the frame, and their inner ends are provided with suitable sprockets, pulleys or the like for receiving a sprocket chain, belt or band running to and engaging similar sprockets, pulleys or the like on the ends of the rolls 4. Preferably this connecting member will be in the form of a non-stretchable metal band, such as shown at 25, which is perforated and engaged by pins or teeth on the wheels or pulleys of the shafts and rolls respectively. Should this band or chain stretch the slack can be taken up by adjusting the lengths of the arms 8 in the lower ends of which the rolls 4 are rotatably mounted,—such as by making said arms in two parts, and providing the same with slots 26 through which pass clamping bolts 27.

Means are also provided for varying the distance between the rolls 4 and the slot 2, such means being shown as vertical bolts 29 threaded in the longitudinal frame members 10 at the corners of the frame and resting on the main frame 30. By turning these bolts the frame as a whole can be raised or lowered and thus the position of the rolls 4 relative to the slot 2 can be varied so as to get the rolls close enough to the slot to insure the roughly dimensioned sheet being fed into the rolls and yet far enough away from said slot so as not to interfere with their rotation. As shown in the drawings, particularly Fig. 2, the rolls almost contact the top surface of the refractory member 1, and said refractory member and rolls are so positioned that the top of the molten bath lies substantially at the axes of said rolls. Consequently the rolls in effect are immersed in the molten bath substantially for one-half of their diameters.

The rolls 4 will ordinarily be rotated slowly,—at about the linear speed of the surface of the sheet passing therethrough,— but may be given a faster or slower speed, or even rotated in the opposite direction. When forming sheets which are to be stretched after rolling the rolls 4 will be given a peripheral speed less than the linear speed of the withdrawing device, in order to effect such stretching and reduce the sheet in thickness. Under these conditions the rolls will be smooth and highly polished so that the rolled sheet will be given a perfectly smooth surface. The stretching of the surfaces of the sheet so formed imparts a brilliant luster thereto, and the slipping of the surfaces of the glass over the surfaces of the rolls tends to marver and smooth the glass and thus eliminate any lines which otherwise might be formed on the sheet due to imperfections in the rolls. Under these conditions the rolls can be rotated either with the movement of the sheet being formed or in the opposite direction, as the latter manifestly also results in fresh and cool surfaces of the rolls being continuously brought into contact with the sheet being formed and also secures the smoothing or marvering of the surfaces of the glass sheet. When it is not desired to reduce the thickness of the sheet after it leaves the rolls 4, said rolls will be driven with a peripheral movement in the direction of the movement of the sheet and at the same linear speed. Under these conditions the rolls may be ribbed or figured in any way to produce ribbed or figured glass. Suitable change gears, indicated at 21ª, are provided in the train of gearing 21, 22 to permit of changing the speed of rotation of the rolls 4.

The annealing and withdrawing devices illustrated are those illustrated and described in my prior application Serial No. 493,212, filed August 18, 1921, but if desired any other arrangement or type of withdrawing and annealing devices can be used. As shown, the glass sheet passes up through the leer 31 and then to the withdrawing device 32 located above said leer. This leer is formed in two parts, to-wit, an upper stationary part 33 provided with electrical heating means 34, and a lower vertically movable part 35 also provided with electrical heating means and with gas heating means in the form of gas nozzles 36 at its lower end, and is divided into a number of chambers by the hinged diaphragms 37, all as described in the above identified application and which need not be described in detail here because any suitable leer or annealing arrangement will serve the present purposes.

The withdrawing device 32 comprises a pair of endless bands or belts 39 passing around the pulleys 40 and 41 at their lower ends and around similar pulleys at their upper ends. These endless bands may be of any suitable construction, such as chains passing over sprocket wheels and faced with asbestos members for engaging the faces of the glass sheet, all as illustrated and described in the above identified application. This apparatus serves not only as a means for carrying the glass sheet along but also, to a certain extent, as an annealing apparatus, because the glass, while it passes through its critical temperature in the leer beneath, is still at a relatively high temperature when it passes between the endless belts, and the asbestos covering of these belts serves to prevent too rapid cooling. The extent to which the glass cools in passing through this device depends upon the length of the device and upon the thickness of the asbestos employed, or upon the use of supplemental devices which may be employed to either hasten or retard the cooling of the glass after it passes between the belts.

In the operation of the apparatus disclosed, the refractory member 1 is positioned in the glass bath with its slot 2 located several inches below the top of said bath, so that the molten glass is forced up through the slot 2 and between the rollers 4. In starting the apparatus the parts are allowed to heat for some time before the drawing operation is started. During this period of heating, compressed air is supplied to the interior of the rolls 4 in order to prevent them heating to such extent that the molten glass will adhere thereto. When the parts have been heated to a proper temperature, the bait is dipped into the molten bath, and after the glass in the slot 2 becomes adherent thereto, said bait is moved slowly upwardly, forming the glass sheet as illustrated, the base of the sheet being anchored to the submerged portion of the refractory member 1. The roughly dimensioned sheet passes between the rolls 4, and as it is then still plastic and has soft surfaces, said rolls reduce it to more exact dimensions, to a uniform thickness and with exactly parallel surfaces. The sheet remains plastic for some distance above the rolls and the speed of the withdrawing device relative to the speed of the rolls may be such that the sheet is stretched and thinned to the proper thickness before it cools sufficiently to harden and set. This also imparts to the surfaces of the sheet a high degree of luster or polish. The thickness of the sheet is determined by the distance to which the rolls 4 are spaced apart, by the speed of withdrawing, by the rate of cooling of the sheet as determined by the air supply to the interior of the rolls 4, and by the temperature at which the leer is run.

Since the forming slot 2 is located below the surface of the molten bath, it attains the same temperature as the bath. It therefore serves to feed to the rolls 4 a preliminarily shaped sheet of glass of uniform temperature throughout. It is essential that the dimensioning rolls 4 be so closely adjacent the forming slot that no material body of molten glass will intervene between the rolls and the slot, so that there is no opportunity for the formation of hardened films or skins on the surfaces of the sheet before it enters the rolls 4. This is important because it is impractical to reduce the thickness of a sheet or mass of glass by rolling after hardened films or skins form on the surfaces of it due to the fact that under such conditions the rolling action produces wrinkles or waves in the surfaces of the sheet. With the rolls lying for substantially one-half of their diameters below the top surface of the molten bath, as shown, the slot-dimensioned sheet immediately and directly passes between said rolls that it is acted upon by them when of substantially the same consistency throughout, thus avoiding the difficulty of wrinkling or waving the surfaces above mentioned. Indeed, in the arrangement shown the slot-extrusion and roll-dimensioning occur in such quick succession that the glass is in substantially the same state throughout in both actions.

As a result of the process described sheet glass is continuously formed, at a high rate of speed, such glass is free from striations, may be given a smooth fine surface substantially free from vertical lines, is of substantial uniform thickness, and is properly annealed continuously as formed.

It is obvious that many modifications can be made in the specific apparatus illustrated and described, and no limitations are therefore to be imposed beyond the terms of the claims hereinafter made. It is not necessary that the sheet be drawn from the bath vertically upwardly as illustrated. It may be drawn laterally or even vertically downwardly. Also the rolls may be so shaped as to give either a thick edge or a thin edge as may be required, without departing from the spirit of my invention.

I claim:

1. The process of forming sheet glass which consists in drawing molten glass from a molten bath in a manner to impart to it a shape similar to the finished sheet, subjecting said sheet immediately adjacent the bath to parallel traveling pressure on its opposite faces and for substantially its entire width and thereby imparting more accurate dimensions thereto, and artificially cooling said traveling pressure means.

2. The process of forming sheet glass which consists in drawing a sheet from a bath of molten glass while the base of the sheet is anchored in the bath and thereby preliminarily shaping the sheet, subjecting said sheet immediately adjacent the bath to parallel traveling pressure on its opposite faces and for substantially its entire width and thereby giving it more accurate dimensions, artificially cooling said traveling pressure means, and then stretching said sheet to thin the same.

3. The process of forming sheet glass from a bath of molten glass which consists in extruding the glass through a hot slot and thereby imparting to it a shape similar to the finished sheet, subjecting said sheet immediately adjacent the slot to parallel traveling pressure on its opposite faces and for substantially its entire width and thereby imparting more accurate dimensions thereto, artificially cooling said traveling pressure means, and pulling the sheet from said traveling pressure means.

4. The process of forming sheet glass from a bath of molten glass which consists in extruding the glass through a hot slot and thereby imparting to it a shape similar to the finished sheet, subjecting said sheet immediately adjacent the slot to parallel traveling pressure on its opposite faces and for substantially its entire width and thereby imparting more accurate dimensions thereto, artificially cooling said traveling pressure means, and then stretching said sheet to thin the same.

5. The process of forming sheet glass from a bath of molten glass which consists in extruding the molten glass through a slot in a refractory body in the bath, immediately, and before hardened films or skins are formed on its surfaces passing the plastic glass through parallel metal rolls contacting the faces thereof for the entire width of the sheet, and artificially cooling said rolls to prevent the glass sheet from adhering thereto.

6. The process of forming sheet glass from a bath of molten glass which consists in extruding the molten glass through a slot in a refractory body located in the bath, immediately, and before hardened films or skins are formed on its surfaces passing the plastic sheet between parallel metal rolls, artificially cooling said rolls, and then stretching the sheet.

7. In apparatus for forming sheet glass from a bath of molten glass, a member provided with a slot for shaping the sheet and so positioned in relation to the bath that the glass is extruded therethrough, and parallel traveling surfaces immediately adjacent the slot and contacting the faces of the sheet extruded through the slot and serving to dimension the same.

8. In apparatus for forming sheet glass from a bath of molten glass, a member provided with a slot for shaping the sheet and so positioned in relation to the bath that the glass is extruded therethrough, parallel traveling surfaces immediately adjacent the slot and contacting the faces of the sheet extruded through the slot and serving to dimension the same, and means for pulling the sheet from said traveling surfaces.

9. In apparatus for forming sheet glass from a bath of molten glass, a member provided with a slot for shaping the sheet and so positioned in relation to the bath that the glass is extruded therethrough, parallel traveling surfaces immediately adjacent the slot and contacting the faces of the sheet extruded through the slot and serving to dimension the same, and means for stretching the sheet after it leaves the traveling surfaces.

10. In apparatus for forming sheet glass from a bath of molten glass, the combination of a hot slot, means for extruding the molten glass through said slot and thereby preliminarily shaping the sheet, and artificially cooled parallel traveling surfaces immediately adjacent said slot and contacting the faces of the sheet extruded through said slot throughout its width and serving to more accurately dimension the same.

11. In apparatus for forming sheet glass from a bath of molten glass, the combination of a hot slot, means for extruding the molten glass through said slot and thereby preliminarily shaping the sheet, artificially cooled parallel traveling surfaces immediately adjacent said slot and contacting the face of the sheet extruded through said slot throughout its width and serving to more accurately dimension the same, and means for pulling the sheet from said traveling surfaces.

12. In apparatus for forming sheet glass from a bath of molten glass, the combination of a hot slot, means for extruding the molten glass through said slot and thereby preliminarily shaping the sheet, artificially cooled parallel traveling surfaces immediately adjacent said slot and contacting the face of the sheet extruded through said slot throughout its width and serving to more accurately dimension the same, and means for stretching the sheet after it leaves said traveling surfaces.

13. In apparatus for forming sheet glass from a bath of molten glass, a refractory member provided with a slot located in the bath, and metal rolling surfaces immediately adjacent said slot and contacting the faces of the sheet extruded through said slot throughout its width.

14. In apparatus for forming sheet glass from a bath of molten glass, a refractory member provided with a slot, and parallel metal rolls in the bath immediately adjacent said slot and contacting the faces of the sheet extruded through said slot throughout its width.

15. In apparatus for forming sheet glass from a bath of molten glass, a refractory member provided with a slot located in the bath, metal rolls immediately adjacent said slot and contacting the faces of the sheet extruded through said slot throughout its width, and means for cooling said rolls.

16. In apparatus for forming sheet glass from a bath of molten glass, a refractory member provided with a slot located in the bath, metal rolls immediately adjacent said slot and contacting the faces of the sheet extruded through said slot throughout its width, and means for withdrawing said sheet as formed by said rolls.

17. In apparatus for forming sheet glass from a bath of molten glass, a refractory member provided with a slot located in the bath, parallel metal rolls immediately adjacent said slot and contacting the faces of the sheet extruded through said slot throughout its width, and means for driving said rolls.

18. In apparatus for forming sheet glass from a bath of molten glass, a refractory member provided with a slot located in the bath, metal rolls immediately adjacent said slot and contacting the faces of the sheet extruded through said slot throughout its width, means for cooling said rolls, and means for driving said rolls.

19. In apparatus for forming sheet glass from a bath of molten glass, a refractory member provided with a slot located in the bath, metal rolls immediately adjacent said slot and contacting the faces of the sheet extruded through said slot throughout its width, means for driving said rolls, and means for pulling the sheet from said rolls.

20. In apparatus for forming sheet glass from a bath of molten glass, a refractory member provided with a slot located in the bath, metal rolls immediately adjacent said slot and contacting the faces of the sheet extruded through said slot throughout its width, means for cooling said rolls, and means for stretching the sheet after it leaves the rolls.

21. In apparatus for forming sheet glass from a bath of molten glass, a refractory member provided with a slot located in the bath, metal rolls immediately adjacent said slot and contacting the faces of the sheet extruded through said slot throughout its width, means for withdrawing the sheet from said rolls, and means for driving said rolls at variable speeds.

22. In apparatus for forming sheet glass from a bath of molten glass, a refractory member provided with a slot located in the bath, metal rolls immediately adjacent said slot and contacting the faces of the sheet extruded through said slot throughout its width, and means for varying the distance between said rolls and said slot.

23. In apparatus for forming sheet glass from a bath of molten glass, a refractory member provided with a slot located in the bath, metal rolls immediately adjacent said slot and contacting the faces of the plastic sheet extruded through said slot throughout its width, means for varying the distance between said rolls and said slot, and means for driving said rolls.

24. In apparatus for forming sheet glass from a bath of molten glass, a refractory member provided with a slot located in the bath, metal rolls immediately adjacent said slot and contacting the extruded plastic sheet throughout its width, and means for varying the width of the space between said rolls.

25. In apparatus for forming sheet glass from a bath of molten glass, a refractory member provided with a slot located in the bath, metal rolls immediately adjacent said slot and contacting the extruded plastic sheet throughout its width, means for varying the width of the space between said rolls, and means for driving said rolls.

In testimony whereof, I sign my name.

HALBERT K. HITCHCOCK.